United States Patent [19]

Bannink, Jr.

[11] Patent Number: 4,556,591

[45] Date of Patent: Dec. 3, 1985

[54] CONDUCTIVE BONDED/BOLTED JOINT SEALS FOR COMPOSITE AIRCRAFT

[75] Inventor: Engbert T. Bannink, Jr., Auburn, Wash.

[73] Assignee: The Boeing Company, Seattle, Wash.

[21] Appl. No.: 305,446

[22] Filed: Sep. 25, 1981

[51] Int. Cl.$^4$ ............................................. B65F 65/28
[52] U.S. Cl. ..................... 428/43; 244/1 A; 244/123; 244/131; 244/133; 244/135 R; 403/2; 403/24; 403/267; 428/223; 428/244; 428/273; 428/408; 428/415
[58] Field of Search ............... 156/155, 344, 92, 254, 156/98, 276, 152, 289, 247, 307.3, 313, 330; 403/2, 267, 24; 252/511; 29/402.08, 426.4; 244/135 R, 123, 133, 131, 1 A; 361/216, 218; 428/35, 273, 43, 408, 223, 415, 244; 174/84 R, 84 S; 339/275 R; 523/468

[56] References Cited

U.S. PATENT DOCUMENTS

| | | | |
|---|---|---|---|
| 2,140,672 | 12/1938 | Gray et al. | 156/92 |
| 2,304,263 | 12/1942 | Lüty | 156/313 |
| 2,688,576 | 9/1954 | Ryan et al. | 252/511 |
| 3,140,342 | 7/1964 | Ehrreich et al. | 174/35 GC |
| 3,146,142 | 8/1964 | Maly | 156/289 |
| 3,192,091 | 6/1965 | Hey et al. | 156/344 |
| 3,347,978 | 10/1967 | Simon et al. | 156/276 |
| 3,707,429 | 12/1972 | Saunders | 428/168 |
| 3,723,223 | 3/1973 | Le Compte | 156/313 |
| 3,726,738 | 4/1973 | Gellon et al. | 156/276 |
| 3,728,427 | 5/1973 | Thompson | 264/101 |
| 3,795,047 | 3/1974 | Abolafia et al. | 29/843 |
| 4,219,980 | 9/1980 | Loyd | 156/92 |
| 4,323,623 | 4/1982 | Ahrens et al. | 156/330 |

FOREIGN PATENT DOCUMENTS 1584006  2/1981  United Kingdom ............... 252/511

*Primary Examiner*—John J. Gallagher
*Attorney, Agent, or Firm*—Eugene O. Heberer; Delbert J. Barnard

[57] ABSTRACT

In a composite aircraft formed of graphite reinforced epoxy plates forming walls (14, 16) of the aircraft and walls of fuel tanks (12) therein, for example, there is an adhesive seal (36) for bonding overlapping faying plate surfaces together. The seal (36) is formed of spaced glass fibers (58) impregnated with a resin and with a filler of conductive material (50). The conductive filler is carbon in the form of approximate microspheres (52, 54), generally hollow, and having diameters in the range of 5 to 150 microns. The resin is cured on the faying surfaces after they have been secured together by fasteners (28) coated with a dielectric (30). The carbon microspheres (50) function to weaken the adhesive seal (36) between the plates (16, 22) so that they can be forcibly separated without structural damage to the plates. The conductive material (50) equalizes negative and positive static charges in the aircraft, particularly in fuel tanks, to eliminate electrical potential differences in the wall structures and in the materials therein.

10 Claims, 5 Drawing Figures

CONDUCTIVE BONDED/BOLTED JOINT SEALS FOR COMPOSITE AIRCRAFT

TECHNICAL FIELD

The invention relates to composite aircraft made from reinforced epoxy resin plates in which the aircraft walls and parts thereof are formed of such plates which have overlapping faying surfaces bolted and bonded together. The bonding materials form seals between the plates, particularly for fuel tanks, integral with the wings or other parts of the aircraft structure.

Composites are combinations of materials differing in composition or form. The constituents retain their identities in the composites; that is, they do not dissolve or otherwise merge completely into each other although they act together. Normally, the components can be physically identified.

BACKGROUND ART

The sealing of joints in a composite aircraft made from epoxy resins presents two problems with respect to the seals, particularly with respect to fuel tanks which would be positioned integrally in the aircraft, primarily in the wings. The first is an electrical current conduction problem in the composite joints and the second is in the repair of such joints. The possibility of repairs can relate to any part of the aircraft but particularly are required in fuel leak problems in the integral fuel tanks. Fuel leaks, particularly in military aircraft, are very common and are a high maintenance cost item. It is expected that this problem will exist in the same manner and to the same extent in composite aircraft where the fuel tanks are made of graphite reinforced epoxy resins.

None of the presently used sealing concepts in fuel tanks, except one, can stand up to the rigors of high loading and temperature extremes over an extended period of time. This fuel sealing concept with unusual reliability is in a bonded/bolted concept known as the "Scotchweld Process". It is usable in aluminum structures but is not applicable to composite structures because of the repair procedure. The repair procedure requires that the structure be cooled below freezing and that a wedge be driven between the aircraft skin and the substructure to break the adhesive bond that forms part of the tank seal. This repair operation does not damage the aluminum structure but if it were attempted with composite structures formed of epozy resin plates, the skins and substructure of the plates would delaminate because the presently used matrix epoxy materials are more brittle than the adhesives, especially at low temperatures.

A search of the patent literature was made with respect to the electrical current conduction problem and the fuel tank leak problem but no solutions were found. For example, a Netherlands publication No. 7,404,508, dated Oct. 4, 1974, disclosed the embedding of particles in a thermoplastic layer bonded to metal. These bonds were provided to produce peel resistance of the plastic so as to cause it to separate from the metal along the line where the embedded particles would lie when the plastic is pulled in tension at right angles to the metal surface. When pulled at right angles, the plastic breaks along the embedded particles.

U.S. Pat. No. 3,347,978 suggests the use of carbon particles in a resin for rendering adhesive joints electrically conductive, column 3, line 62.

U.S. Pat. No. 3,728,427 teaches the use of a static electricity bleed in the form of a resinous gel which contains conductive metal slivers, flakes or needles.

The following patents found are considered to be of general interest:

U.S. Pat. No. 3,140,342; U.S. Pat. No. 3,726,738; U.S. Pat. No. 3,707,429; U.S. Pat. No. 3,795,047; and British Pat. No. 698,210/53.

DISCLOSURE OF THE INVENTION

The invention is the combination of an adhesive seal bonding structure in composite joints between graphite reinforced epoxy plates, the seal structure itself, particularly in an aircraft.

Because composite joints formed between the epoxy plates, forming the wings or fuselage, or fuel tanks integral therewith, are bolted or riveted in addition to being sealed, a reduced demand can be placed on the sealing adhesive with respect to margins of safety. The bolting pattern is designed so that the individual joints will carry the limit or the ultimate load even if the adhesive failed.

According to the invention, it has been determined that the adhesive bondlines can be altered intentionally by a filler or an interlayer of materials that will permit the easy formation of a crack in the bondline. It was surprisingly found that a conventional resin filled with carbon microspheres provided a bonding seal between graphite reinforced epoxy plates, adapted to be used in composite aircraft structure, including the fuel tanks, and permitted easy splitting of the seal between the plates without damage to the plates. That is, for repair purposes when the fasteners were removed, the plates were split with a wedge and the damage was confined to the bondline within the seal as desired.

In addition, the conductive carbon filler served to bleed off the static electrical charges that developed in the plate structure forming the aircraft and/or fuel tanks. That is, the conductive filler equalizes the static charges so as to eliminate potential differences in the structure.

The carbon spheres are hollow and have a diameter in the range of from 5 to 150 microns. The carbon is substantially lighter in weight than the resin and thus serves as a weight reducer in an aircraft in direct proportion to the extent that the seal is used. The weight percent of the carbon filler with respect to the weight of the resin is between 20 to 35%, and typically may be about 25%. In applying the seal, the resin and carbon filler are mixed and then used to impregnate a porous glass cloth or a layer of spaced fibers, inserted between faying surfaces of overlapping plates which are adapted to be secured together by bolt or rivet fasteners, coated with a dielectric. Use of the dielectric coating would typically prevent the metal fasteners from bleeding off static charges; hence, the need for another means such as the conductive carbon filler.

The secured plates are inserted into an oven where the resin is cured and the seal is formed.

As the prior art discussed above has indicated, carbon has been used as a means for bleeding off static and other charges to in effect ground the charges. However, the prior art does not suggest the present inventive structure and method. For example, the Netherlands publication teaches the use of foreign particles in a thermoplastic layer so as to increase the peel strength of the plastic and cause it to separate along the line where the embedded particles lie when the plastic is pulled in tension at right angles to the metal surface. In contrast, the present invention is designed to reduce the joint strength of a fuel tank seal adhesive, for example, in a composite airplane so that it will shear along the path of the carbon microspheres and not damage the adjacent plate structure. Because the plates are made of laminations they would be subject to delamination if the filler increased the peel strength of the plastic seal.

Futher advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings which are for illustrative purposes.

BEST MODE FOR CARRYING OUT THE INVENTION

Figure 1:
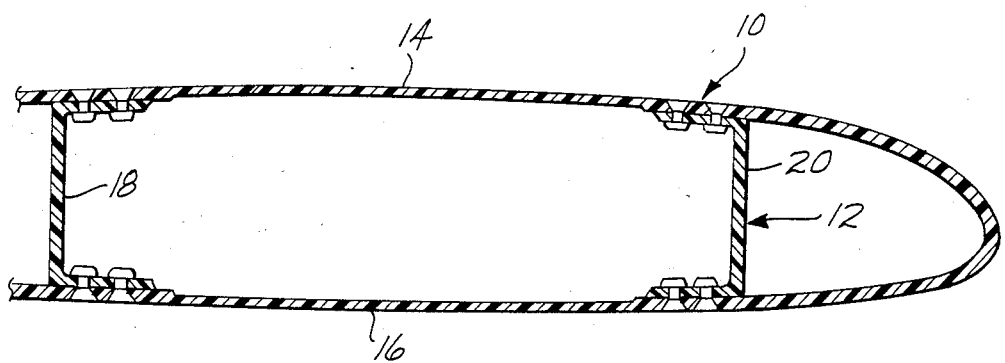
FIG. 1 is a fragmentary cross sectional view of an airplane wing, illustrating a fuel tank integral with the wing.

Referring again to the drawings, there is shown in FIG. 1 a fragmentary portion of a wing 10 of a composite aircraft. Composite aircraft may, for example, be formed of graphite reinforced epoxy plates. The plates, for the most part, are secured together at overlapping surfaces by dielectric coated metal fasteners in the form of bolts or rivets. Between the overlapping surfaces there are resin seals, particularly where the plates form fuel tanks.

Each plate is made from a multiple of laminations, each lamination being comprised of reinforcing graphite in the form of woven fibers or elongated spaced fibers. In both situations the graphite fibers are impregnated with an epoxy resin and the individual layers are positioned together and cured in an oven at about 300 degrees F. to form the solid laminated plate. The graphites used may be such as those described commercially as Hercules AS, Celion 3000, or Union Carbide T 300 and the resins may be such as Shell Epon 828, Narmco 5208, Hercules 3501, or Fiberite 934. The combination of resins and fibers used are Narmco 5208/T300, Hercules 3501/AS, and Fiberite 934/T300. The advantages of such materials in aircraft are that they are lightweight and stiff, compared to aluminum, for example. They also require no prestressing around fastener holes and do not suffer from fatigue in the sense that metal does.

The tested individual plate laminations had thicknesses of between 0.005 and 0.015 inches. Composite plates are as thick as 0.5 inch. When another resin is bonded on a plate, such as in the form of a seal, there is a problem in separating the two resins when repairs must be made to a fuel tank, for example. The problem is that the seal would tend to delaminate the plate when it is being removed therefrom for opening the tank. Seals, according to the invention, are made from the same type of resins mentioned above or from other conventional thermosetting resins.

Figure 2:
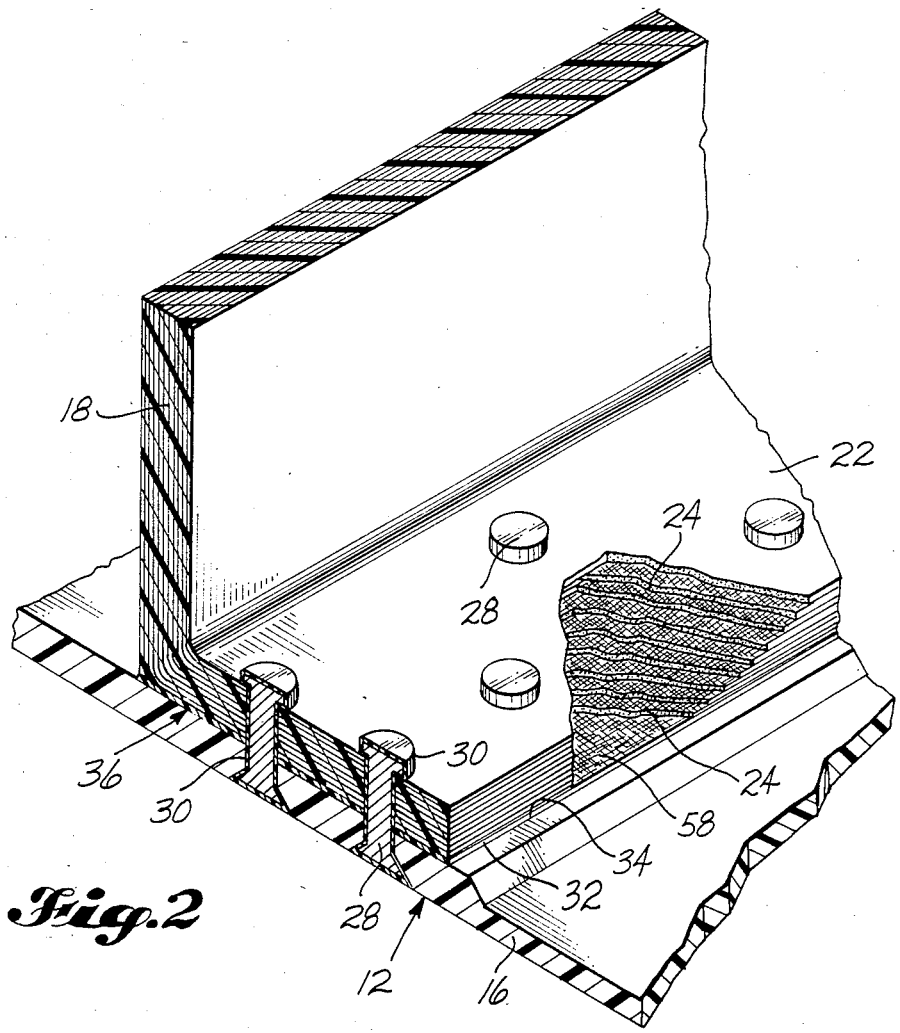
FIG. 2 is an enlarged end view of a corner of the wing tank in FIG. 1, illustrating the wing tank seal and the dielectric coated fasteners securing the sealed plates together.

In FIGS. 1 and 2, there is shown in end view a fuel tank 12 integral within the wing 10. Upper and lower walls 14 and 16 are walls both of the wing and the tank 12. Sidewalls 18 and 20 close the tank laterally between the two outer wing walls.

The walls 14, 16, 18 and 20 are formed of graphite reinforced epoxy plates as described above. The walls 18 and 20 are channel-shaped and as shown in FIG 2, the lower end of the wall 18 has a short channel leg 22. The walls are also in "I" beam form.

The laminations usually cannot be seen in a finished end of a wall surface as provided by the plate 18 and its leg 22, but the series of laminations 24 are indicated in a broken away area in the leg 22.

Generally throughout a composite aircraft, plate members such as 22 and 16 are secured together by rivets or bolts 28 which may be tightened in a conventional way from the exterior or lower end of the tank 12, for example. Each of the bolts 28 are coated with a dielectric 30. The dielectric can be a sealant coating, an "O"-ring seal under the head, a washer with an embedded seal under a nut, a corrosion inhibiting coating on the fastener or a combination of the foregoing.

Extending between the plate parts 22 and 16, along their overlapping surfaces 32 and 34, is a resin seal, according to the invention, generally designated as 36.

Figure 3:
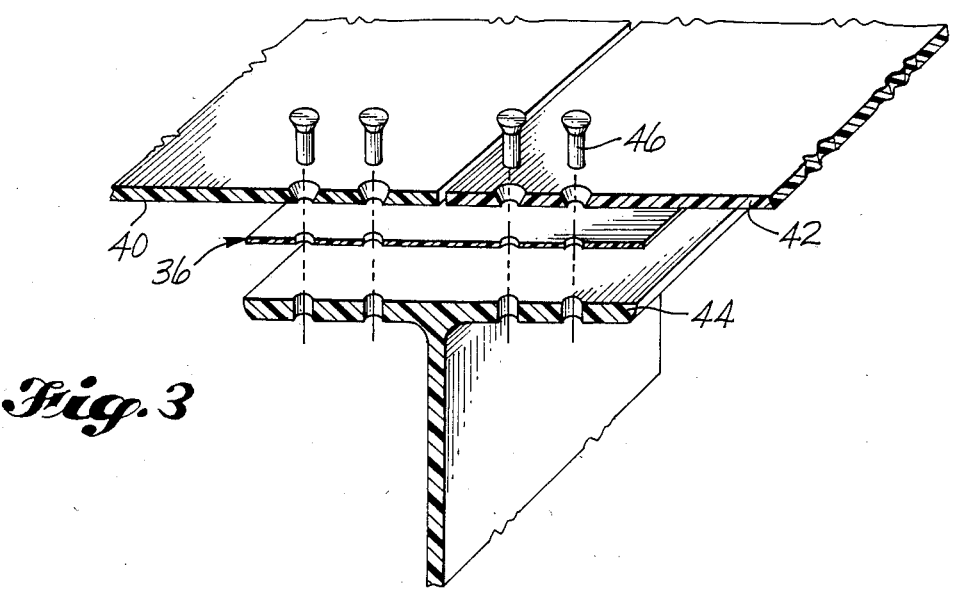
FIG. 3 is a pictorial exploded view, illustrating a seal according to the invention, and joints to be sealed thereby.

A seal 36 is shown in FIG. 3 where it is adapted to be adhesively bonded to faying surfaces of graphite epoxy plates 40, 42 and 44. The plates are secured together by a multiple of dielectric coated, flat-headed fasteners 46.

Figure 4:
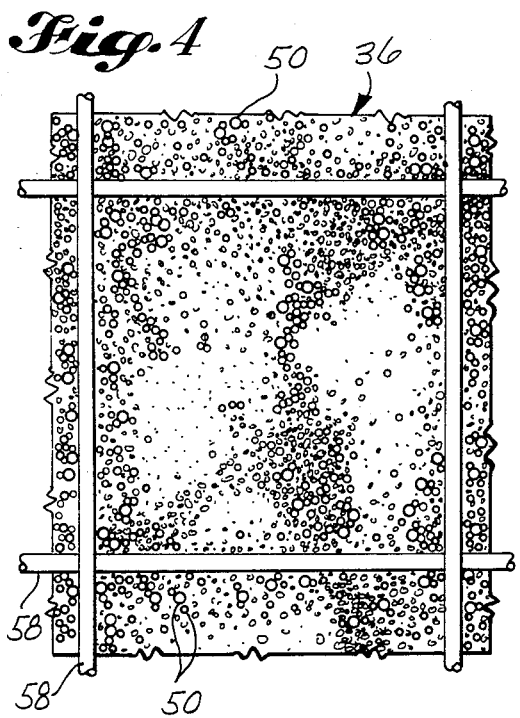
FIG. 4 is a plan view of the filler carbon microspheres, magnified about 50 times.
Figure 5:
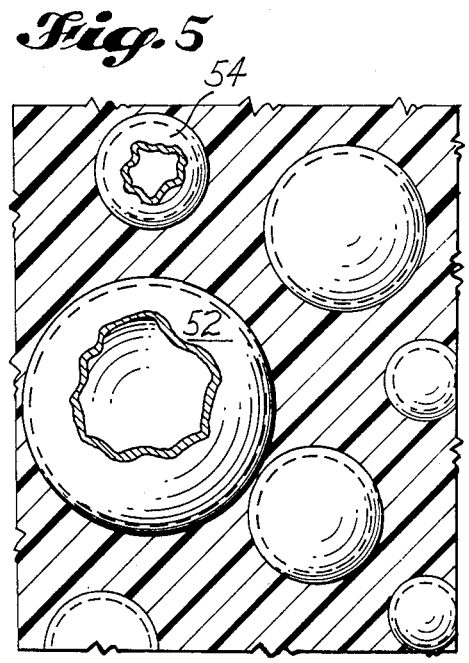
FIG. 5 is a view of the hollow carbon microspheres in a resin, magnified about 800 times.

The seal is made from an uncured resin in liquid form, as described above, by being mixed with hollow carbon microspheres, shown as 50 in FIG. 4, magnified about 50 times and as shown as cut spheres 52 and 54 in FIG. 5. The spheres 52 and 54 are magnified about 800 times and to the naked eye appear to be carbon dust. A continuous conductive contact extends along the carbon, the carbon spheres substantially forming a thin discontinuous, approximate layer, FIG. 4. However, the carbon is partially discontinuous with epoxy therebetween, FIGS. 4 and 5; that is, there is not a solid layer of spheres. The actual size of the spheres vary in the range of 5 to 150 microns.

The mixed liquid resin and carbon are applied to thin glass cloth or thin glass fibers so that the cloth or fibers are fully impregnated with the mixture. The cloth 58, as shown in FIGS. 2 and 4, has a rectangular mesh of about 1/32 of an inch to a side. The uncured seal 36, as shown in FIG. 3, is applied to the surfaces of the plates as shown in FIG. 2 and then the fasteners 28 are inserted to secure the plates together.

Individual parts throughout the aircraft are secured together as shown in FIGS. 2 and 3, and are then placed in an oven in a temperature between 250 and 350 degrees F. to cure the resin and adhesively bond the plates and seal together, forming the seal between the plates.

The weight percent of the carbon with respect to the resin in the seal is in the range of between 20 and 35 and typically is about 25 weight percent. The thickness of the cured seal is about 0.013 inches.

Fuel tanks, as 12, eventually develop leaks and repairs must be made. Similarly, other repairs must be made to parts of the aircraft, avoiding damage to the plates which must be separated. For example, if the tank 12 had a leak along the seal 36 between the plate 22 and the plate 16, the plates would have to be separated in order to put in a new seal. In such a situation, the bolts 28 would be drilled out. Because the adhesive bondline has been weakened by the carbon filler, a wedge can be applied between the plates along the seal to cause the plates to be separated without damage thereto. After the repairs have been completed, a new seal can be installed and new bolts are inserted and the resin is again cured as necessary.

As stated, the carbon filler, which weakens the adhesive bond so that the plates can be easily separated, also equalizes static charges to eliminate differences in potential, that is, in effect grounds the charges by bleeding off static electricity. Further, the carbon filler is considerably lighter weight than the resin, and thus, has a lightening effect throughout the aircraft. It is considered that the carbon filler is sufficiently conductive to solve any arcing problem that might occur in a joint caused by lightning.

The bonding seals, according to the invention, are believed to have the reliability equivalent to the "Scotchweld Process" in aluminum aircraft.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to the specific form shown or uses mentioned except as defined in the accompanying claims.

What is claimed is:

1. In an aircraft, composite plates formed of reinforced epoxy resin, said plates forming wall structures having bonded sealed joints, comprising:
   adhesive bonding means forming a bonding seal between surfaces of overlapping wall structures to form a joint;
   each wall structure plate being formed having layers of reinforcing fibers impregnated with epoxy resin to form multiple generally parallel laminations in the plates on the layers of fibers; and
   the adhesive bonding means including conductive material and a resin mixed with thin fibers, the resin in the mixture being cured between the overlapping surfaces;
   said conductive material forming a continuous conductive contact path within the bonding means and being substantially in the form of a thin discontinuous, approximate layer; the material being irregularly spaced by resin adjacent the continuous conductive contact path;
   a sufficient amount of conductive material being present in the bonding means to weaken the bonding means so that the plates can be forcibly separated at the joint without structurally changing the laminations of the plates.

2. The invention according to claim 1 including:
   fasteners extending through the plates and the overlapping surfaces to further secure the plates together at the joint; and
   means associated with the fasteners to render them dielectric.

3. The invention according to claim 1 in which:
   the approximate layer of conductive material forms part of a bondline in the joint to permit the laminated plastic plates to be wedged apart at the bondline,
   whereby damage from the wedging is limited to the bondline within the bonding means.

4. The invention according to claim 1 in which:
   the reinforcing fibers are graphite;
   the resin in the adhesive bonding means being an epoxy.

5. The invention according to claim 1 in which:
   the conductive material is in the form of carbon microspheres having diameters in the range of 5 to 150 microns,
   said microspheres being generally hollow.

6. The invention according to claim 5 in which:
   the adhesive bonding means has a thickness of about 0.013".

7. The invention according to claim 6 in which:
   the weight percent of the carbon with respect to the resin in the bonding means is in the range of between 20 to 35, and the density of the carbon microspheres is substantially less than that of the resin in the bonding means.

8. The invention according to claim 7 in which:
   the laminations have thicknesses in the range of between 0.005" and 0.015".

9. In an aircraft, composite plates formed of reinforced epoxy resin, said plates forming wall structures having bonded sealed joints, comprising:
   adhesive bonding means forming a bonding seal between surfaces of overlapping wall structures to form a joint; the adhesive bonding means having a thickness of about 0.013";
   each wall structure plate being formed having layers of reinforcing graphite fibers impregnated with epoxy resin to form multiple generally parallel laminations in the plates on the layers of fibers;
   the adhesive bonding means including generally hollow carbon microspheres having diameters in the range of 5 to 150 microns and a resin mixed with thin fibers, the resin in the mixture being cured between the overlapping surfaces;
   said microspheres forming a continuous conductive contact path within the bonding means and being substantially in the form of a thin discontinuous, approximate layer; the microspheres being irregularly spaced by resin adjacent the continuous conductive contact path;
   the approximate layer of microspheres forms part of a bondline in the joint, the microspheres being present in an amount sufficient to weaken the bonding means to permit the laminated plastic plates to be wedged apart at the bondline, whereby damage from the wedging is limited to the bondline within the bonding means and there is no structural change to the laminations of the plates;
   fasteners extending through the plates and the overlapping surfaces to further secure the plates together at the joint; and
   means associated with the fasteners to render them dielectric;
   the weight percent of the microspheres with respect to the resin in the bonding means is in the range of between 20 to 35, and the density of the carbon microspheres is substantially less than that of the resin in the bonding means.

10. In an aircraft, composite plates formed of reinforced epoxy resin, said plates forming wall structures having bonded sealed joints, comprising:

adhesive bonding means forming a bonding seal between surfaces of overlapping wall structures to form a joint;

each wall structure plate being formed having layers of reinforcing graphite fibers impregnated with epoxy resin to form multiple generally parallel laminations in the plates on the layers of fibers; the laminations having thicknesses in the range of between 0.005" and 0.015";

the adhesive bonding means including generally hollow carbon microspheres having diameters in the range of 5 to 150 microns and an epoxy resin mixed with thin structural fibers, the resin in the mixture being cured between the overlapping surfaces;

said microspheres forming a continuous electrically conductive contact path within the bonding means and being substantially in the form of a thin discontinuous, approximate layer; the microspheres being irregularly spaced by resin adjacent the continuous conductive contact path;

the approximate layer of microspheres forms part of a bondline in the joint, the microspheres being present in an amount sufficient to weaken the bonding means to permit the laminated plastic plates to be wedged apart at the bondline, whereby damage from the wedging is limited to the bondline within the bonding means and there is no structural change to the laminations of the plates;

fasteners extending through the plates and the overlapping surfaces to further secure the plates together at the joint; and means associated with the fasteners to render them dielectric;

the weight percent of the microspheres with respect to the resin in the bonding means is in the range of between 20 to 35, and the density of the carbon microspheres is substantially less than that of the resin in the bonding means.

* * * * *